(12) United States Patent
Wang

(10) Patent No.: US 10,120,167 B2
(45) Date of Patent: Nov. 6, 2018

(54) OPTICAL CAMERA LENS

(71) Applicant: Jianming Wang, Shenzhen (CN)

(72) Inventor: Jianming Wang, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 96 days.

(21) Appl. No.: 15/416,682

(22) Filed: Jan. 26, 2017

(65) Prior Publication Data
US 2018/0164548 A1 Jun. 14, 2018

(30) Foreign Application Priority Data

Dec. 14, 2016 (CN) .......................... 2016 1 1156646

(51) Int. Cl.
*G02B 9/60* (2006.01)
*G02B 13/00* (2006.01)
(52) U.S. Cl.
CPC ........... *G02B 13/0045* (2013.01); *G02B 9/60* (2013.01)

(58) Field of Classification Search
CPC ...... G02B 13/0045; G02B 13/18; G02B 3/04; G02B 9/60
USPC .......................................... 359/764, 765, 768
See application file for complete search history.

(56) References Cited

U.S. PATENT DOCUMENTS

2016/0154213 A1* 6/2016 Chang ................ G02B 13/0045
359/764

* cited by examiner

*Primary Examiner* — Collin X Beatty
(74) *Attorney, Agent, or Firm* — Na Xu; IPro, PLLC

(57) ABSTRACT

The present disclosure relates to the field of optical lens, and discloses an optical camera lens, which includes: an aperture, a first lens having positive refraction power, a second lens having negative refraction power, a third lens having negative refraction power, a fourth lens having positive refraction power and a fifth lens having negative refraction power, which satisfy following relational expressions: $0.70 < f1/f < 0.80$, $-1.9 < f2/f < -1.7$, $-18 < f3/f < -13$, $0.59 < f4/f < 0.63$, $-0.52 < f5/f < -0.48$; $17 < v3/n3 < 20$, $1.08 < n3/n5 < 1.20$, $0.03 < d5/TTL < 0.04$, $1.08 < (f3-f4)/(f3+f4) < 1.10$. The optical camera lens provided by the present disclosure can satisfy the requirements on high pixel and large image height.

9 Claims, 8 Drawing Sheets

OPTICAL CAMERA LENS

TECHNICAL FIELD

The present disclosure relates to the field of optical lens and, particularly, relates to an optical camera lens adapted for portable terminal devices such as smart cellphone, digital camera etc. and for camera devices such as monitor, PC lens etc.

BACKGROUND

In recent years, as the booming development of the smart cellphone, the need on miniaturized camera lens is increasing gradually. However, the photosensitive component of conventional camera lens is either a charge coupled device (Charge Coupled Device, CCD) or a complementary metallic-oxide semiconductor sensor (Complementary Metal-Oxide Semiconductor Sensor, CMOS Sensor). With the development of semiconductor processing technique, pixel size of the photosensitive component is reduced. In addition, the electronic product at present is developed to have better functions and a lighter and thinner configuration. Therefore, a miniaturized camera lens with better imaging quality has already become the mainstream in the current market.

In order to obtain better imaging quality, a traditional lens carried in a cellphone camera usually adopts a three-lens or four-lens structure. As the development of techniques and increasing of user's diversified needs, in the situation of the pixel area of the photosensitive component being reduced, and the requirements of the system on imaging quality being increased constantly, a five-lens structure appears in the lens design gradually. However, although the normal five-lens structure can correct major optical aberration of an optical system, but cannot satisfy requirements on high pixel and large image height.

DESCRIPTION OF EMBODIMENTS

In order to make objectives, technical solutions and advantages of the present disclosure more clearly, embodiments of the present disclosure will be illustrated in detail with reference to the accompanying drawings. Those skilled in this art should understand, in each implementing manner of the present disclosure, in order to make the reader understand the present disclosure, a plurality of technical details have been proposed. However, the technical solutions protected by the present disclosure shall also be implemented without these technical details and the various modifications and variations presented in the embodiments.

Figure 1:
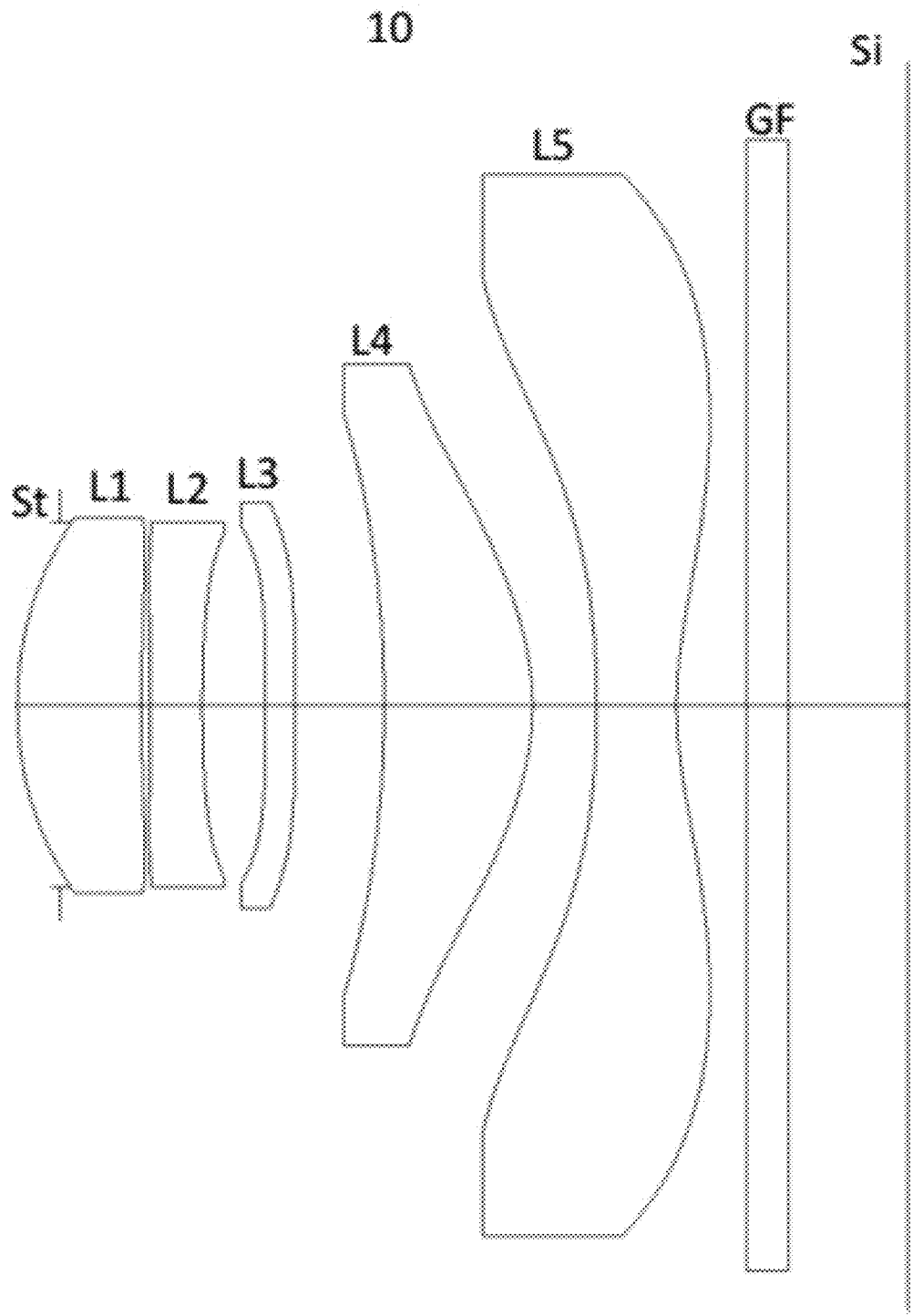
FIG. 1 is a structural schematic diagram of an optical camera lens according to an exemplary embodiment of the present disclosure.

Referring to the figures, the present disclosure provides an optical camera lens. FIG. 1 shows an optical camera lens 10 of an exemplary embodiment of the present disclosure, the optical camera lens 10 includes five lenses. Specifically, the optical camera lens 10, from the object side to the image side, successively includes: an aperture St, a first lens L1, a second lens L2, a third lens L3, a fourth lens L4 and a fifth lens L5. An optical component such as an optical filter GF can be arranged between the fifth lens L5 and an imaging surface Si.

The first lens L1 has positive refraction power, an object-side surface thereof bulges outward to be a convex surface, an aperture St is arranged between the object and the first lens L1. The second lens L2 has negative refraction power, in the present embodiment, an image-side surface of the second lens L2 is a concave surface. The third lens L3 has negative refraction power, in the present embodiment, an object-side surface of the third lens L3 is a concave surface. The fourth lens has positive refraction power, the fourth lens L4 having positive refraction power can distribute the positive refraction power of the first lens L1, so as to reduce sensitivity of the system. In the present embodiment, an object-side surface of the fourth lens L4 is a concave surface, an image-side surface thereof is a convex surface. The fifth lens L5 has negative refraction power, which can effectively reduce field curvature of the system. In the present embodiment, an object-side surface of the fifth lens L5 is a concave surface.

Herein, a focal length of the integral optical camera lens 10 is defined as f, a focal length of the first lens L1 is defined as f1, a focal length of the second lens L2 is defined as f2, a focal length of the third lens L3 is defined as f3, a focal length of the fourth lens L4 is defined as f4, a focal length of the fifth lens L5 is defined as f5. The f, f1, f2, f3, f4 and f5 satisfy the following relational expressions: $0.70<f1/f<0.80$, $-1.9<f2/f<-1.7$, $-18<f3/f<-13$, $0.59<f4/f<0.63$, $-0.52<f5/f<-0.48$. In addition, an abbe number of the third lens is v3, a refractive index of the third lens is n3, a refractive index of the fifth lens is n5, a thickness of the third lens is d5, a total track length of the optical camera lens is TTL, which satisfy the following relational expressions: $17<v3/n3<20$, $1.08<n3/n5<1.20$, $0.03<d5/TTL<0.04$, $1.08<(f3-f4)/(f3+f4)<1.10$.

When the focal lengths of the optical camera lens 10 and each lens meet the above relational expressions, the refraction power configuration of each lens can be controlled/adjusted, which can correct aberration so as to guarantee imaging quality, perform better light permeability meanwhile having better optical performance, and also has good aberration eliminating effect, so as to satisfy requirements on high pixel and large image height.

Specifically, in an embodiment of the present disclosure, the focal length f1 of the first lens, the focal length f2 of the second lens, the focal length f3 of the third lens, the focal length f4 of the fourth lens and the focal length f5 of the fifth lens can be designed so as to satisfy the following relational expressions: $2.7<f1<3.0$, $-7.3<f2<-6.8$, $-66<f3<-53$, $2.2<f4<2.4$, $-2.1<f5<-1.9$, unit: millimeter (mm). Such a design can further shorten the total track length (TLL) of the integral optical camera lens 10, so as to maintain the characteristics of miniaturization.

Optionally, the total track length TTL of the optical camera lens 10 according to an embodiment of the present disclosure is equal to or less than 4.45 mm. Such a design is more advantageous to achieve the optical camera lens 10 design on the miniaturization of the system. Optionally, in an embodiment of the present disclosure, the optical camera lens 10 is an optical system with a relative large aperture, which can improve imaging performance in a low irradiance environment.

The material of each lens can be glass or plastic. In the optical camera lens 10 of the present disclosure, the third lens L3 is made of glass, which can increase the freedom of the refraction power configuration of the optical system of the present disclosure, the first lens L1, the second lens L2, the fourth lens L4 and the fifth lens L5 are made of plastic, which can effectively reduce production cost.

Optionally, the optical camera lens 10 of the embodiments of the present disclosure is a Hybrid micro camera lens, the refractive index n3 of the third lens satisfies relative expression: n3>1.67.

Further, in a preferred embodiment of the present disclosure, a refractive index n1 of the first lens, a refractive index n2 of the second lens, the refractive index n3 of the third lens, a refractive index n4 of the fourth lens and the refractive index n5 of the fifth lens satisfy following conditional expressions: 1.50<n1<1.55, 1.63<n2<1.68, 1.68<n3<1.72, 1.52<n4<1.56, 1.52<n5<1.55. Such a design is advantageous for an appropriate matching of the lenses with material, so that the optical camera lens 10 can obtain better imaging quality.

It should be noted that, in an embodiment of the present disclosure, an abbe number v1 of the first lens, an abbe number v2 of the second lens, the abbe number v3 of the third lens, an abbe number v4 of the fourth lens and an abbe number v5 of the fifth lens can be designed to satisfy the following relational expressions: 52<v1<62, 20<v2<24, 30<v3<32, 48<v4<58, 53<v5<63. Such a design can suppress the phenomenon of optical chromatic aberration during imaging by the optical camera lens 10.

Optionally, the abbe number v1 of the first lens, the abbe number v3 of the third lens satisfy the following relational expression: 18<V1−V3<28. Such a design is more advantageous to correct chromatic aberration.

It should be understood that, the design solution of the refractive index of each lens and the design solution of the abbe number of each lens can be combined with each other so as to be applied to the design of the optical camera lens 10, thus, the second lens L2 and the third lens L3 adopt an optical material with high a refractive index and a low abbe number, which can effectively reduce chromatic aberration of the system, and significantly improve imaging quality of the optical camera lens 10.

It should be noted that, optionally, the optical camera lens satisfies following relational expression: 0.40<|f1/f2|<0.42. Such a design is advantageous to correct the system spherical difference of integral optical camera lens.

Besides, the surface of the lens can be an aspheric surface, the aspheric surface can be easily made into shapes other than spherical surface, so as to obtain more controlling varieties, which are used to eliminate aberration so as to reduce the number of the lens used, thereby can reduce the total track length of the optical camera lens of the present disclosure effectively. In an embodiment of the present disclosure, the object-side surface and the image-side surface of each lens are all aspheric surfaces.

Optionally, an inflection point and/or a stationary point can be provided on the object-side surface and/or the image-side surface of the lens, so as to satisfy the imaging needs on high quality, the specific implementing solution is as follows.

The design data of the optical camera lens 10 according to Embodiment 1 of the present disclosure is shown as follows.

Table 1 and Table 2 show data of the lens in the optical camera lens 10 according to Embodiment 1 of the present disclosure.

TABLE 1

| Focal length (mm) | |
|---|---|
| f | 3.868 |
| f1 | 2.877 |
| f2 | −7.005 |
| f3 | −54.877 |
| f4 | 2.349 |
| f5 | −1.927 |

In which, meaning of each symbol is as follows.
f: focal length of the optical camera lens 10;
f1: focal length of the first lens L1;
f2: focal length of the second lens L2;
f3: focal length of the third lens L3;
f4: focal length of the fourth lens L4;
f5: focal length of the fifth lens L5.

TABLE 2

| | | Curvature radius (R) (mm) | Thickness/ Distance (d) (mm) | | Refractive index (nd) | | Abbe number (vd) |
|---|---|---|---|---|---|---|---|
| St | St | ∞ | d0 = | −0.215 | | | |
| L1 | R1 | 1.336 | d1 = | 0.617 | nd1 1.5441 | v1 | 56.04 |
| | R2 | 7.448 | d2 = | 0.043 | | | |
| L2 | R3 | −18.714 | d3 = | 0.260 | nd2 1.6510 | v2 | 21.51 |
| | R4 | 6.151 | d4 = | 0.314 | | | |
| L3 | R5 | −38.944 | d5 = | 0.145 | nd3 1.6890 | v3 | 31.30 |
| | R6 | 1752.384 | d6 = | 0.443 | | | |
| L4 | R7 | −4.512 | d7 = | 0.737 | nd4 1.5441 | v4 | 56.04 |
| | R8 | −1.057 | d8 = | 0.320 | | | |
| L5 | R9 | −3.472 | d9 = | 0.397 | nd5 1.5352 | v5 | 56.12 |
| | R10 | 1.535 | d10 = | 0.346 | | | |
| GF | R11 | ∞ | d11 = | 0.210 | ndg 1.5168 | vg | 64.17 |
| | R12 | ∞ | d12 = | 0.595 | | | |

St is aperture, R1, R2 are the object-side surface and the image-side surface of the first lens L1, respectively; R3, R4 are the object-side surface and the image-side surface of the second lens L2, respectively; R5, R6 are the object-side surface and the image-side surface of the third lens L3, respectively; R7, R8 are the object-side surface and the image-side surface of the fourth lens L4, respectively; R9, R10 are the object-side surface and the image-side surface of the fifth lens L5, respectively; R11, R12 are the object-side surface and the image-side surface of the optical filter GF, respectively. Meanings of other symbols are as follows.

d0: axial distance from the aperture St to the object-side surface of the first lens L1;
d1: axial thickness of the first lens L1;
d2: axial distance from the image-side surface of the first lens L1 to the object-side surface of the second lens L2;
d3: axial thickness of the second lens L2;
d4: axial distance from the image-side surface of the second lens L2 to the object-side surface of the third lens L3;
d5: axial thickness of the third lens L3;
d6: axial distance from the image-side surface of the third lens L3 to the object-side surface of the fourth lens L4;

d7: axial thickness of the fourth lens L4;
d8: axial distance from the image-side surface of the fourth lens L4 to the object-side surface of the fifth lens L5;
d9: axial thickness of the fifth lens L5;
d10: axial distance from the image-side surface of the fifth lens L5 to the object-side surface of the optical filter GF;
d11: axial thickness of the optical filter GF;
d12: axial distance from the image-side surface of the optical filter GF to the imaging surface;
nd1: refractive index of the first lens L1;
nd2: refractive index of the second lens L2;
nd3: refractive index of the third lens L3;
nd4: refractive index of the fourth lens L4;
nd5: refractive index of the fifth lens L5:
ndg: refractive index of the optical filter GF;
v1: abbe number of the first lens L1;
v2: abbe number of the second lens L2;
v3: abbe number of the third lens L3;
v4: abbe number of the fourth lens L4;
v5: abbe number of the fifth lens L5;
vg: abbe number of the optical filter GF.

Table 3 shows aspheric surface data of each lens in the optical camera lens 10 according to Embodiment 1 of the present disclosure.

TABLE 3

|  | Cone coefficient | Aspheric surface coefficient | | | | | | |
|---|---|---|---|---|---|---|---|---|
|  | k | A4 | A6 | A8 | A10 | A12 | A14 | A16 |
| R1 | −6.7416E−01 | 3.3229E−02 | 1.1547E−02 | 1.4304E−02 | −4.6353E−02 | −2.4386E−03 | 6.3228E−02 | −6.9968E−02 |
| R2 | 5.7384E+01 | −1.6641E−01 | 2.2430E−01 | −1.7144E−01 | −5.0403E−02 | −3.6180E−02 | −1.1004E−02 | 5.4976E−02 |
| R3 | 2.6030E+02 | −4.6536E−02 | 3.1377E−01 | −2.6378E−01 | 7.9350E−02 | 5.4462E−02 | −2.4104E−01 | 2.2169E−01 |
| R4 | 3.4087E+01 | 6.0009E−02 | 2.3940E−01 | −2.3706E−01 | −1.0315E−01 | 2.2101E−01 | 5.1768E−01 | −7.5282E−01 |
| R5 | 2.1276E+03 | −2.4523E−01 | −3.6831E−02 | 1.5816E−01 | −7.1740E−01 | 2.8659E−01 | 1.6794E+00 | −1.7485E+00 |
| R6 | −7.1080E+01 | −1.9318E−01 | −1.7759E−02 | 2.7535E−02 | −8.0542E−02 | −4.2876E−02 | 3.3456E−01 | −1.9639E−01 |
| R7 | 2.0917E+00 | 1.4090E−03 | −7.2538E−03 | 2.7686E−02 | −4.4953E−02 | 2.6438E−02 | −3.2090E−03 | −1.0495E−03 |
| R8 | −3.4792E+00 | −5.7393E−02 | 2.2348E−02 | 2.0871E−02 | −1.4505E−02 | 2.3879E−03 | 4.2488E−04 | −1.3587E−04 |
| R9 | −2.6101E+01 | −1.1734E−01 | 4.8301E−02 | −8.7387E−03 | 7.6738E−04 | −2.7024E−06 | −3.5068E−06 | 3.5564E−09 |
| R10 | −1.0221E+01 | −7.3911E−02 | 2.6388E−02 | −7.0018E−03 | 9.5921E−04 | −2.9590E−05 | −8.5802E−06 | 7.9222E−07 |

Table 4 and Table 5 show the design data of inflection point and stationary point of each lens in the optical camera lens 10 according to Embodiment 1 of the present disclosure. R1, R2 respectively represent the object-side surface and the image-side surface of the first lens L1, R3; R4 respectively represent the object-side surface and the image-side surface of the second lens L2; R5, R6 respectively represent the object-side surface and the image-side surface of the third lens L3; R7, R8 respectively represent the object-side surface and the image-side surface of the fourth lens L4; R9, R10 respectively represent the object-side surface and the image-side surface of the fifth lens L5. The data corresponding to the 'position of inflection point' column is the vertical distance from the inflection point disposed on each lens surface to the optical axis of the optical camera lens 10. The data corresponding to the 'position of stationary point' column is the vertical distance from the stationary point disposed on each lens surface to the optical axis of the optical camera lens 10.

TABLE 4

|  | Number of inflection point | Position 1 of the inflection point | Position 2 of the inflection point |
|---|---|---|---|
| R1 | 0 | | |
| R2 | 1 | 0.365 | |

TABLE 4-continued

|  | Number of inflection point | Position 1 of the inflection point | Position 2 of the inflection point |
|---|---|---|---|
| E3 | 1 | 0.375 | |
| R4 | 0 | | |
| R5 | 0 | | |
| R6 | 1 | 0.025 | |
| R7 | 0 | | |
| R8 | 1 | 0.985 | |
| R9 | 1 | 1.365 | |
| R10 | 1 | 0.555 | |

TABLE 5

|  | Number of the stationary point | Position 1 of the stationary point |
|---|---|---|
| R1 | 0 | |
| R2 | 1 | 0.685 |
| E3 | 1 | 0.545 |
| R4 | 0 | |
| R5 | 0 | |

TABLE 5-continued

|  | Number of the stationary point | Position 1 of the stationary point |
|---|---|---|
| R6 | 1 | 0.025 |
| R7 | 0 | |
| R8 | 0 | |
| R9 | 0 | |
| R10 | 1 | 1.275 |

Figure 2:
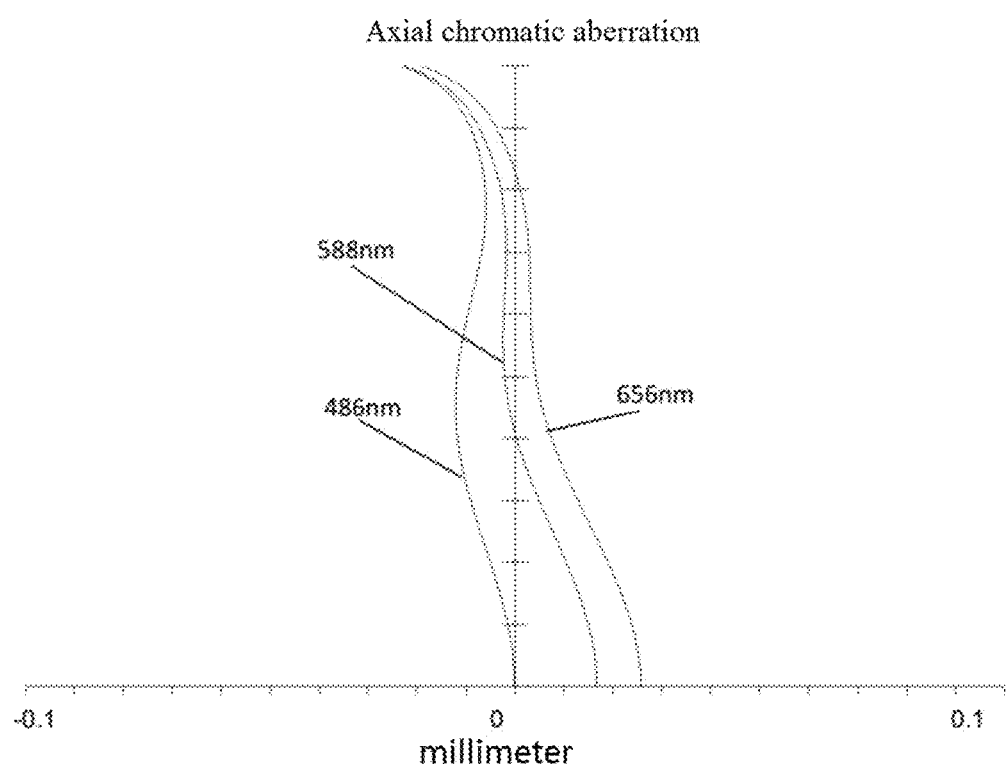
FIG. 2 is a schematic diagram of axial chromatic aberration of an optical camera lens shown in FIG. 1.
Figure 3:
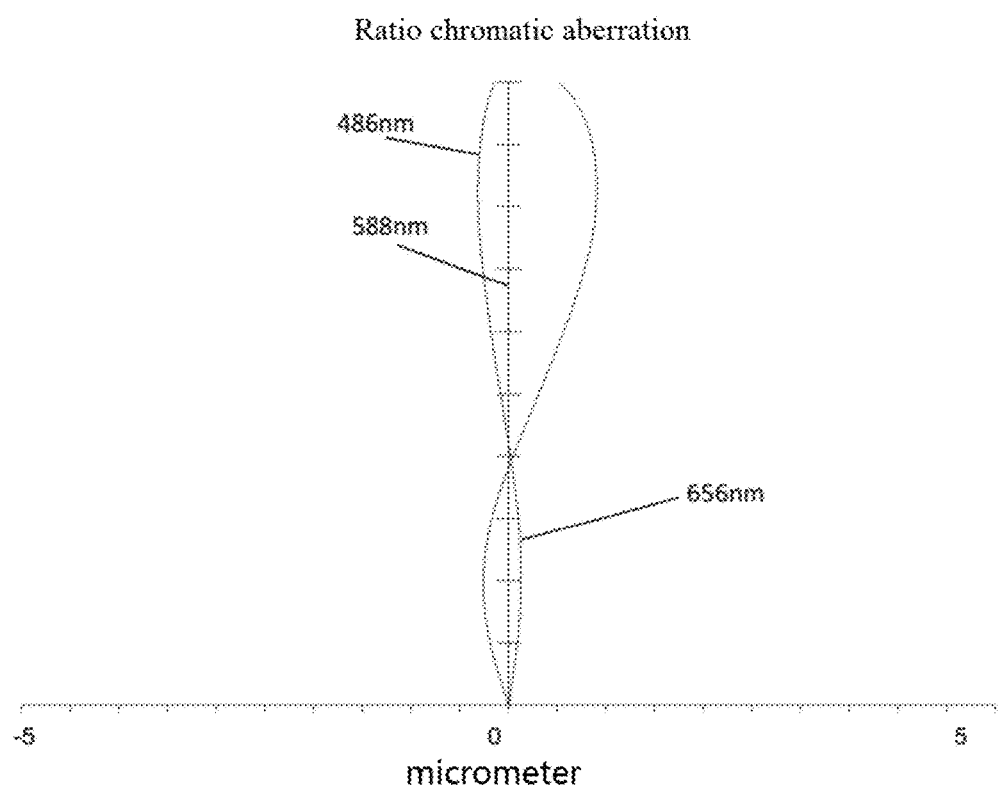
FIG. 3 is a schematic diagram of ratio chromatic aberration of an optical camera lens shown in FIG. 1.
Figure 4:
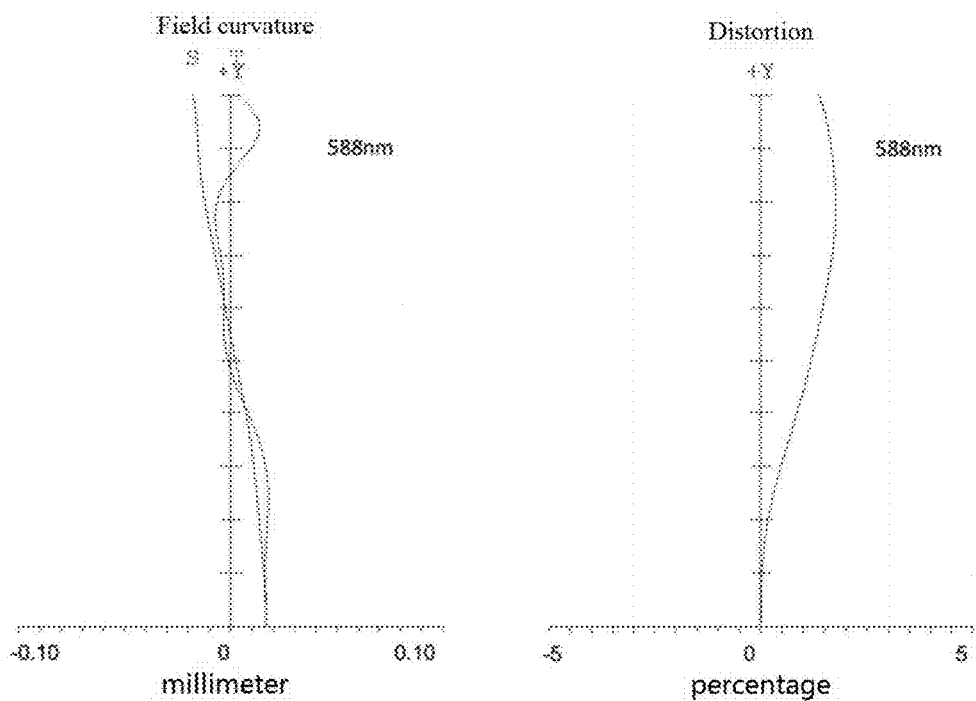
FIG. 4 is a schematic diagram of astigmatism field curvature and distortion of an optical camera lens shown in FIG. 1.

FIG. 2 and FIG. 3 respectively show the schematic diagram of the axial chromatic aberration and ratio chromatic aberration of the optical camera lens 10 according to Embodiment 1 after light with a respective wave length of 486 nm, 588 nm and 656 nm passing through the optical camera lens 10. FIG. 4 shows the schematic diagram of the astigmatism field curvature and distortion of the optical camera lens 10 according to Embodiment 1 after light with a wave length of 588 nm passing through the optical camera lens 10.

The following table 6 lists values with respect to each focal length conditional expression in the present embodiment according to the above conditional expressions. Obviously, the optical camera system of the present embodiment satisfies the above focal length conditional expressions.

TABLE 6

| Conditions | Embodiment 1 |
|---|---|
| 0.70 < f1/f < 0.80 | 0.743914 |
| −1.9 < f2/f < −1.7 | −1.81109 |
| −18 < f3/f < −13 | −14.1876 |
| 0.59 < f4/f < 0.63 | 0.607403 |
| −0.52 < f5/f < −0.48 | −0.49815 |

In the present embodiment, the entrance pupil diameter of the optical camera lens 10 is 1.61 mm, the image height of full field of view is 2.856 mm, the field of view angle in the diagonal direction is 72.34°.

Figure 5:
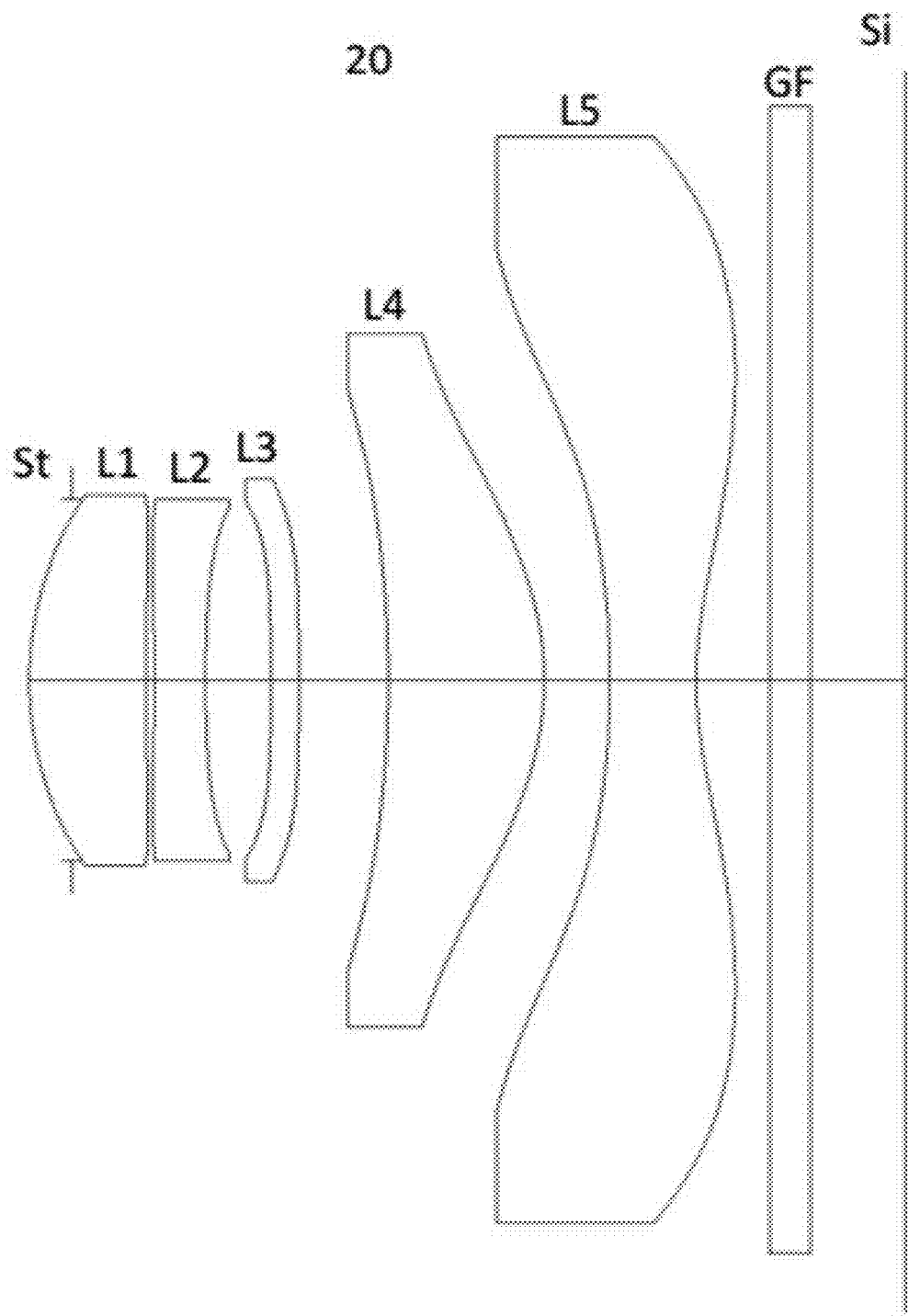
FIG. 5 is a structural schematic diagram of an optical camera lens according to an exemplary embodiments of the present disclosure.

FIG. 5 shows an optical camera lens 20 according to Embodiment 2 of the present disclosure.

The design data of the optical camera lens 20 according to Embodiment 2 of the present disclosure is shown as follows.

Table 7 and Table 8 show data of the lens in the optical camera lens 20 according to Embodiment 2 of the present disclosure.

TABLE 7

| Focal length (mm) | |
|---|---|
| f | 3.868 |
| f1 | 2.836 |
| f2 | −6.870 |
| f3 | −64.876 |
| f4 | 2.414 |
| f5 | −1.869 |

TABLE 8

| | | Curvature radius (R) (mm) | Thickness/ Distance (d) (mm) | Refractive index (nd) | Abbe number (vd) |
|---|---|---|---|---|---|
| St | St | ∞ | d0 = −0.219 | | |
| L1 | R1 | 1.323 | d1 = 0.593 | nd1 1.5441 | v1 56.04 |
| | R2 | 7.607 | d2 = 0.043 | | |
| L2 | R3 | −20.523 | d3 = 0.260 | nd2 1.6510 | v2 21.51 |
| | R4 | 5.828 | d4 = 0.331 | | |
| L3 | R5 | −34.179 | d5 = 0.141 | nd3 1.6510 | v3 21.51 |
| | R6 | −142.003 | d6 = 0.456 | | |
| L4 | R7 | −4.509 | d7 = 0.792 | nd4 1.5441 | v4 56.04 |
| | R8 | −1.084 | d8 = 0.335 | | |
| L5 | R9 | −3.582 | d9 = 0.437 | nd5 1.5441 | v5 56.04 |
| | R10 | 1.456 | d10 = 0.369 | | |

TABLE 8-continued

| | | Curvature radius (R) (mm) | Thickness/ Distance (d) (mm) | Refractive index (nd) | Abbe number (vd) |
|---|---|---|---|---|---|
| GF | R11 | ∞ | d11 = 0.210 | ndg 1.5168 | vg 64.17 |
| | R12 | ∞ | d12 = 0.481 | | |

Table 9 shows aspheric surface data of each lens in the optical camera lens 20 according to Embodiment 2 of the present disclosure.

TABLE 9

| | Cone coefficient | Aspheric surface coefficient | | | | | | |
|---|---|---|---|---|---|---|---|---|
| | k | A4 | A6 | A8 | A10 | A12 | A14 | A16 |
| R1 | −6.8619E−01 | 3.1476E−02 | 1.9168E−02 | 1.9784E−02 | −4.6120E−02 | −7.0219E−03 | 5.6606E−02 | −7.4717E−02 |
| R2 | 5.5964E+01 | −1.6466E−01 | 2.1889E−01 | −1.7406E−01 | −4.4398E−02 | −2.7696E−02 | −3.0246E−02 | −6.6674E−02 |
| R3 | 3.8344E+02 | −5.0211E−02 | 3.1963E−01 | −2.6894E−01 | 6.0630E−02 | 1.6498E−02 | −2.8710E−01 | 2.2443E−01 |
| R4 | 3.5098E+01 | 6.4017E−02 | 2.3799E−01 | −2.4458E−01 | −1.9444E−02 | 2.2228E−01 | 5.3083E−01 | −7.1585E−01 |
| R5 | 3.9453E+02 | −2.4774E−01 | −3.5853E−02 | 1.5938E−01 | −7.1811E−01 | 2.8371E−01 | 1.6788E+00 | −1.7587E+00 |
| R6 | 1.1581E+02 | −1.9796E−01 | −1.8335E−02 | 2.8284E−02 | −8.0247E−02 | −4.2949E−02 | 3.3248E−01 | −2.0316E−01 |
| R7 | 2.1647E+00 | 1.8586E−03 | −7.7907E−03 | 2.7197E−02 | −4.5077E−02 | 2.6487E−02 | −3.1169E−03 | −1.0042E−03 |
| R8 | −3.6274E+00 | −5.9052E−02 | 2.2093E−02 | 2.0914E−02 | −1.4486E−02 | 2.3903E−03 | 4.1949E−04 | −1.3527E−04 |
| R9 | −2.7473E+01 | −1.1765E−01 | 4.8419E−02 | −8.7390E−03 | 7.6083E−04 | −5.3525E−06 | −3.9634E−06 | 1.6838E−07 |
| R10 | −8.2090E+00 | −7.2877E−02 | 2.6435E−02 | −7.0053E−03 | 9.6090E−04 | −2.9262E−05 | −8.5791E−06 | 7.8727E−07 |

Table 10 and Table 11 show the design data of inflection point and stationary point of each lens in the optical camera lens 20 according to Embodiment 2 of the present disclosure. R1, R2 respectively represent the object-side surface and the image-side surface of the first lens L1; R3, R4 respectively represent the object-side surface and the image-side surface of the second lens L2; R5, R6 respectively represent the object-side surface and the image-side surface of the third lens L3; R7, R8 respectively represent the object-side surface and the image-side surface of the fourth lens L4; R9, R10 respectively represent the object-side surface and the image-side surface of the fifth lens L5. The data corresponding to the 'position of inflection point' column is the vertical distance from the inflection point disposed on each lens surface to the optical axis of the optical camera lens 20. The data corresponding to the 'position of stationary point' column is the vertical distance from the stationary point disposed on each lens surface to the optical axis of the optical camera lens 20.

TABLE 10

| | Number of inflection point | Position 1 of inflection point | position 2 of inflection point |
|---|---|---|---|
| R1 | 0 | | |
| R2 | 1 | 0.345 | |
| E3 | 2 | 0.375 | 0.735 |
| R4 | 0 | | |
| R5 | 0 | | |
| R6 | 0 | | |
| R7 | 0 | | |
| R8 | 2 | 0.995 | 1.535 |
| R9 | 1 | 1.365 | |
| R10 | 2 | 0.585 | 2.425 |

TABLE 11

| | Number of the stationary point | Position 1 of the stationary point |
|---|---|---|
| R1 | 0 | |
| R2 | 1 | 0.645 |
| E3 | 1 | 0.545 |
| R4 | 0 | |
| R5 | 0 | |
| R6 | 0 | |
| R7 | 0 | |
| R8 | 0 | |
| R9 | 0 | |
| R10 | 1 | 1.375 |

Figure 6:
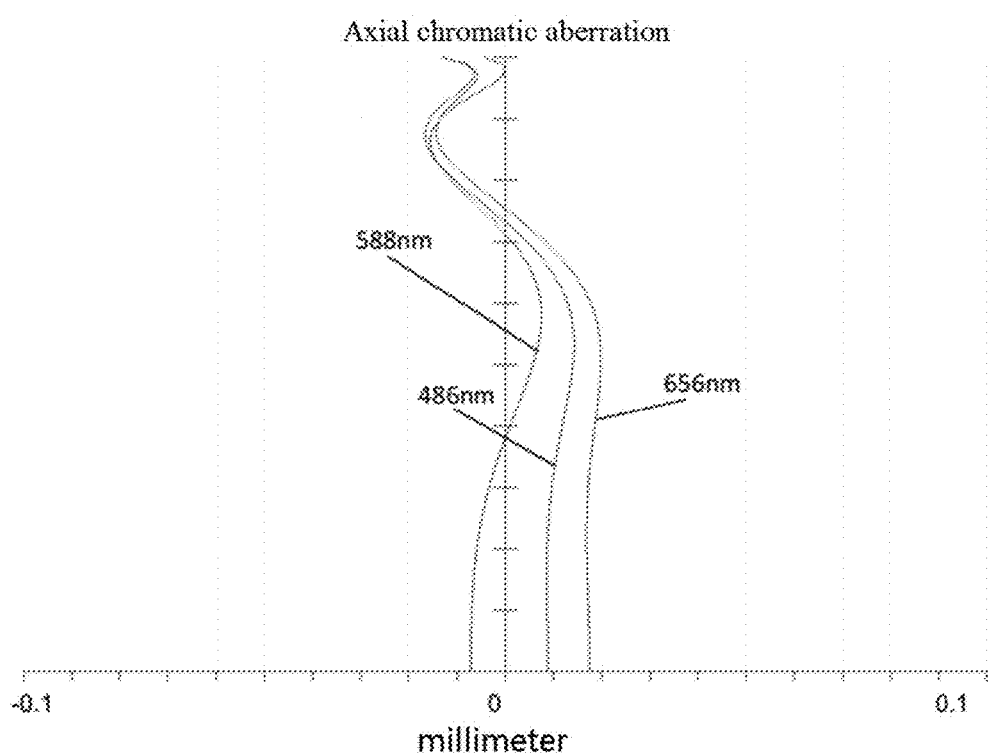
FIG. 6 is a schematic diagram of axial chromatic aberration of an optical camera lens shown in FIG. 5.
Figure 7:
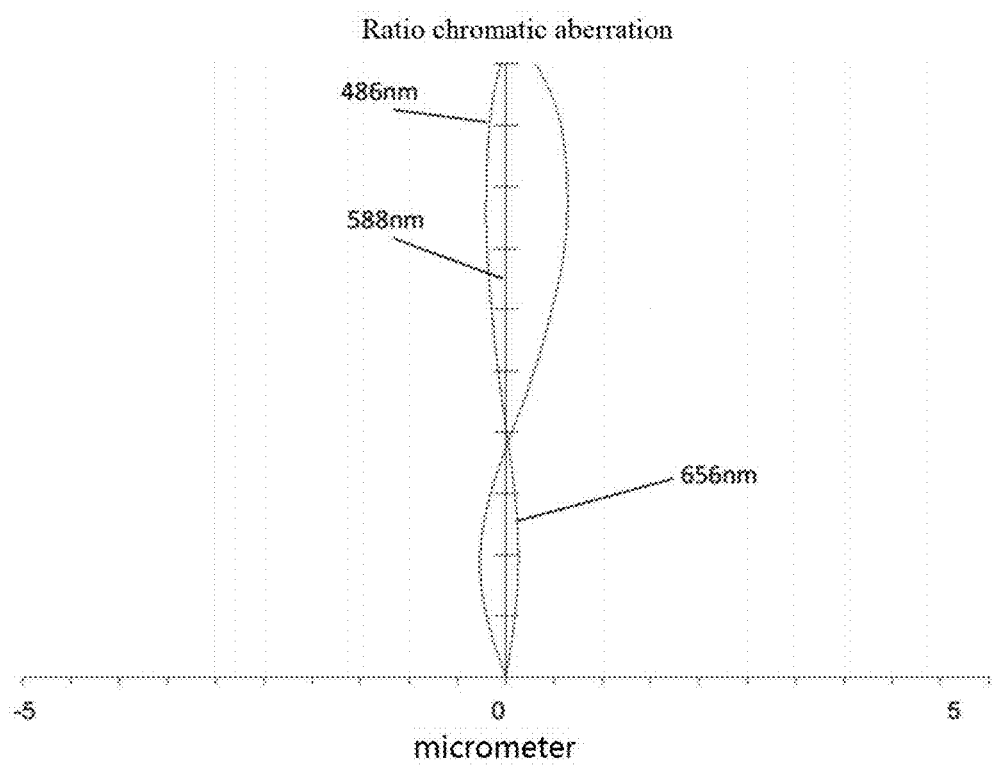
FIG. 7 is a schematic diagram of ratio chromatic aberration of an optical camera lens shown in FIG. 5.
Figure 8:
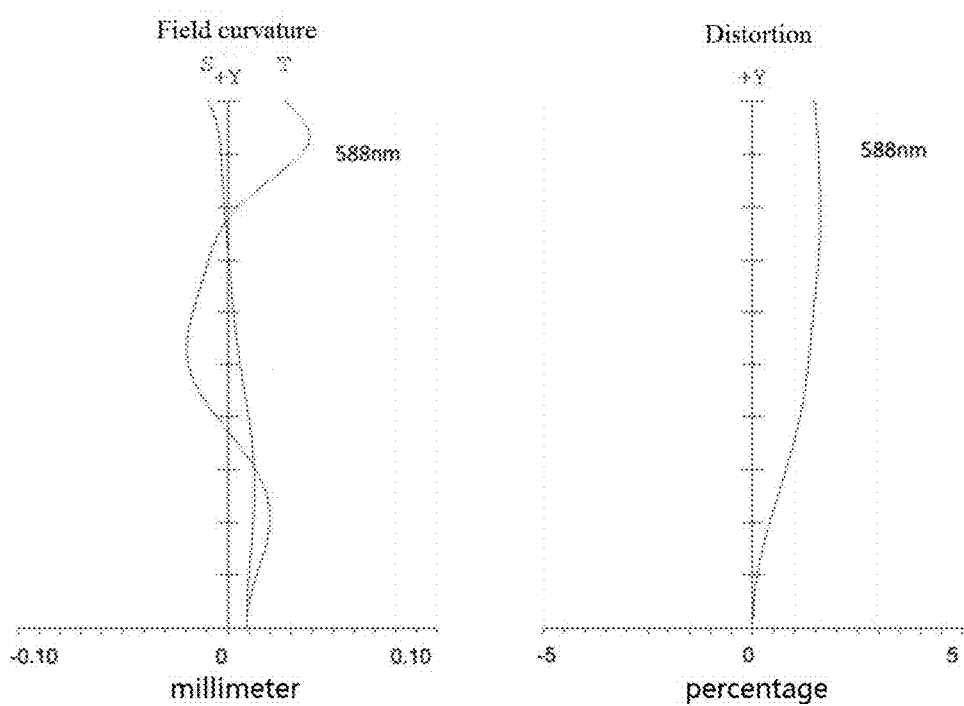
FIG. 8 is a schematic diagram of astigmatism field curvature and distortion of an optical camera lens shown in FIG. 5.

FIG. 6 and FIG. 7 respectively show the schematic diagram of the axial chromatic aberration and ratio chromatic aberration of the optical camera lens 20 according to Embodiment 2 after light with a respective wave length of 486 nm, 588 nm and 656 nm passing through the optical camera lens 10. FIG. 8 shows the schematic diagram of the astigmatism field curvature and distortion of the optical camera lens 20 according to Embodiment 2 after light with a wave length of 588 nm passing through the optical camera lens 10.

The following table 12 lists values with respect to each focal length conditional expression in the present Embodiment 2 according to the above conditional expressions. Obviously, the optical camera system of the present embodiment satisfies the above focal length conditional expressions.

TABLE 12

| Conditions | Embodiment 2 |
|---|---|
| 0.70 < f1/f < 0.80 | 0.733223 |
| −1.9 < f2/f < −1.7 | −1.77627 |
| −18 < f3/f < −13 | −16.7728 |
| 0.59 < f4/f < 0.63 | 0.624159 |
| −0.52 < f5/f < −0.48 | −0.48333 |

In the present embodiment, the entrance pupil diameter of the optical camera lens 20 is 1.61 mm, the image height of full field of view is 2.856 mm, the field of view angle in the diagonal direction is 72.13°.

Person skilled in the art shall understand, the above implementing manners are detailed embodiments of the present disclosure, however, in practical application, various modifications may be made to the forms and details thereof, without departing from the spirit and scope of the present disclosure.

What is claimed is:

1. An optical camera lens, from an object side to an image side, successively comprising:
   an aperture;
   a first lens having positive refraction power;
   a second lens having negative refraction power;
   a third lens having negative refraction power;
   a fourth lens having positive refraction power; and
   a fifth lens having negative refraction power;
   wherein a focal length of the integral optical camera lens is f, a focal length of the first lens is f1, a focal length of the second lens is f2, a focal length of the third lens is f3, a focal length of the fourth lens is f4 and a focal length of the fifth lens is f5, which satisfy following relational expressions:

$0.70 < f1/f < 0.80$;

$-1.9 < f2/f < -1.7$;

$-18 < f3/f < -13$;

$0.59 < f4/f < 0.63$;

$-0.52 < f5/f < -0.48$;

wherein an abbe number of the third lens is v3, a refractive index of the third lens is n3, a refractive index of the fifth lens is n5, a thickness of the third lens is d5, a total track length of the optical camera lens is TTL, which satisfy following relational expressions:

$17 < v3/n3 < 20$;

$1.08 < n3/n5 < 1.20$;

$0.03 < d5/TTL < 0.04$;

$1.08 < (f3-f4)/(f3+f4) < 1.10$.

2. The optical camera lens as described in claim 1, wherein the focal length f1 of the first lens, the focal length f2 of the second lens, the focal length f3 of the third lens, the focal length f4 of the fourth lens and the focal length f5 of the fifth lens satisfy following relational expressions, respectively:

$2.7 < f1 < 3.0$;

$-7.3 < f2 < -6.8$;

$-66 < f3 < -53$;

$2.2 < f4 < 2.4$;

$-2.1 < f5 < -1.9$.

3. The optical camera lens as described in claim 1, wherein the refractive index n3 of the third lens satisfies following relational expression: $n3 > 1.67$.

4. The optical camera lens as described in claim 3, wherein a refractive index n1 of the first lens, a refractive index n2 of the second lens, the refractive index n3 of the third lens, a refractive index n4 of the fourth lens and the refractive index n5 of the fifth lens satisfy following relational expressions, respectively:

$1.50 < n1 < 1.55$;

$1.63 < n2 < 1.68$;

$1.68 < n3 < 1.72$;

$1.52 < n4 < 1.56$;

$1.52 < n5 < 1.55$.

5. The optical camera lens as described in claim 1, wherein an abbe number v1 of the first lens, an abbe number v2 of the second lens, the abbe number v3 of the third lens, an abbe number v4 of the fourth lens and an abbe number v5 of the fifth lens satisfy following relational expressions, respectively:

$52 < v1 < 62$;

$20 < v2 < 24$;

$30 < v3 < 32$;

$48 < v4 < 58$;

$53 < v5 < 63$.

6. The optical camera lens as described in claim 5, wherein the abbe number v1 of the first lens, the abbe number v3 of the third lens satisfy following relational expression:

$$18 < V1 - V3 < 28.$$

7. The optical camera lens as described in claim 1, wherein the total track length of the optical camera lens is less than or equal to 4.45 mm.

8. The optical camera lens as described in claim 1, wherein the optical camera lens satisfies following relational expression: $0.40 < |f1/f2| < 0.42$.

9. The optical camera lens as described in claim 1, wherein the third lens is a glass lens, other lenses are plastic lenses.

* * * * *